June 15, 1926.  1,588,541
R. R. FOSTER
RECOIL SNUBBER FOR VEHICLES
Filed March 3, 1924
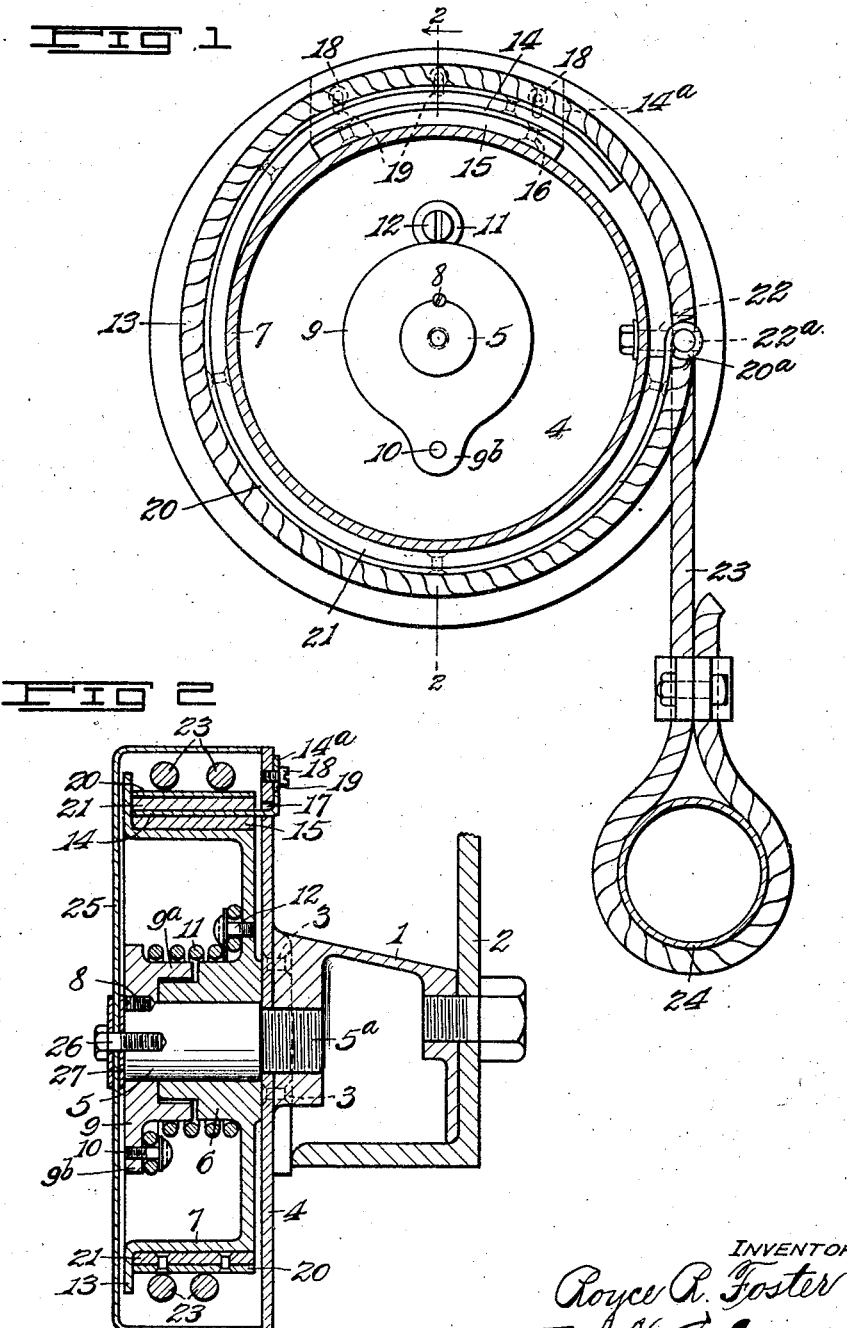
INVENTOR
Royce R. Foster
By N. E. Dunlap
ATTORNEY Patented June 15, 1926.

1,588,541

UNITED STATES PATENT OFFICE.

ROYCE R. FOSTER, OF WHEELING, WEST VIRGINIA.

RECOIL SNUBBER FOR VEHICLES.

Application filed March 3, 1924. Serial No. 696,459.

This invention relates to shock absorbers for vehicles, and it has for its primary object to provide a shock absorber of snubber type which is highly efficient in operation, which is simple in construction, which is composed of but few parts subject to wear or requiring repair or renewal, which requires infrequent, if any, adjustment of its parts following installation.

In describing the invention in detail, reference is herein had to the accompanying drawings, in which—

Figure 1 is a sectional elevation of the invention with the casing cover removed; and—

Figure 2 is a central vertical section on line 2—2, Fig. 1.

Referring to said drawings, 1 indicates a supporting bracket designed for attachment to a suitable part of the side frame 2 of an automobile chassis. Rigidly attached to said bracket, as by rivets 3, is a circular back plate 4, and extended centrally through said plate and having the threaded stem $5^a$ thereof mounted in said bracket is a spindle 5 which has mounted thereon for rotary movement a hub 6 carried by, or formed integral with, a circular drum 7.

Mounted upon the outer end of the spindle 5 and fixed to the latter, as by a key or locking screw 8, is a cap 9 which, as herein shown, has an inner boss $9^a$ disposed in loosely embracing complemental relation to the adjacent end of the hub. Said cap has formed at a suitable point on its circumference a radially directed arm $9^b$ having removably mounted therein on its inner face a pin or screw 10 to which is attached one end of a spiral spring 11. Said spring encircles the boss $9^a$ and hub 6 and has its opposite end attached to the drum 7, as by means of a screw 12.

The drum 7 preferably has an annular flange 13 on the outer portion of the circumferential face thereof, and disposed in seated relation to a portion of said face, preferably the topmost portion, is a friction shoe consisting of a metallic plate 14 and a facing 15 of a suitable wear resisting material, as woven asbestos fabric, said facing being rigidly attached to said plate 14, as by means of rivets 16. Said plate 14 has its inner edge, or a portion thereof, directed outward through a slot 17 provided therefor in the back plate 4, which edge is then turned to form a flange $14^a$ which lies parallel and closely adjacent to the rear face of said back plate. One or more pins or screws 18 carried by said back plate project through holes or vertical slots 19 provided therefor in said flange $14^a$. The slot 17 has a width, and the slots 19 have such length, that the shoe is movable radially toward and away from the drum under rebound and load conditions, respectively. Obviously, the shoe under load conditions tends to occupy a position in which but slight, if any, friction is generated between its facing and the drum.

A friction band consisting of a resilient sheet metal backing 20 and a facing 21 of suitable wear resisting material, as woven asbestos fabric belting, has one end suitably attached to the drum. Said band overlies the shoe and thence passes to and around the major portion of the circumferential drum face not covered by said shoe. The attachment of the friction band to the drum, as herein shown, is effected through the intermediacy of a bolt 22 which is directed through the circumferential portion of the drum and which has a cross-head $22^a$ with its opposite ends pivotally received by eye portions $20^a$ formed on the adjacent end of the metal backing 20.

Attached to the pivoted end of the friction band, which extends clockwise around the drum and has its free end overlying the shoe, is an end of a webbing or cable 23 which likewise extends clockwise one or more times around the drum, the same, however, being wound upon the backing 20 of said band and thence extending downward and having its opposite end attached to the adjacent axle 24 of the vehicle.

In practice, when the frame 2 and the axle 24 are actuated to approach each other from their normal positions, as when a deflection of the vehicle springs incident to a road shock occurs, no obstruction to such relative movement is presented by the mechanism described, and, consequently, the full benefit of said vehicle springs for preventing shock in such movement is obtained. However, said mechanism does function to check the rapidity of separating movement in which the springs tend to assume their normal position, thereby to relieve the force of the recoil or rebound. At the beginning of the return movement, or rebound, the cable 23 is placed under tension and acts to contract the friction band upon the drum and the underlying shoe and to compress the latter closely upon said drum. At the same time the tension applied to the cable acts to rotate the drum on its spindle against the tension of the spring 11, which rotation is strongly resisted by the friction generated between the tightly depressed shoe and said drum on the one hand, and the friction generated between said contracted band and said shoe on the other. This strong resistance to the recoil force serves to retard the rebound and to relieve the shock of the rebound to a very great extent. As is obvious, the spring 11 acts to return the drum to its normal position following its actuation as above described.

It will be noted that a double frictional resistance to rebounds is presented in the mechanism described, the first being that between the shoe and the rotary drum, the former being depressed by the band into firmly seated relation to the drum, and the second being that between the metallic backing of the shoe and the face of the band.

A metal cover 25 is mounted in enclosing relation to the drum and associated parts, the same having an attaching screw 26 directed centrally therethrough into the adjacent end of the spindle 5 with a washer 27 interposed between the cover and said spindle.

What is claimed is—

1. In a snubber, a stationary member, a drum mounted for rotary movement, a spring tending to resist such movement in a forward direction, a shoe disposed for movement into and out of seated frictional relation to the face of said drum under rebound and load condition, respectively, a friction band attached to and embracing said drum and having a portion thereof movable into and out of frictional engagement with said shoe, and a flexible connecting member wound upon said band and attached to said drum.

2. In a snubber, a rotary drum, a shoe disposed for movement into and out of seated frictional relation to the face of said drum, a friction band embracing said drum and overlying said shoe and having connection with and being rotatable with said drum, said band being adapted to be contracted upon the back of said shoe whereby the latter is depressed to its seated position, and a flexible connecting member wound upon said band and attached to said drum, said shoe being adapted for automatic withdrawal from seated relation to said drum when said band is relieved from contracting force.

3. In a snubber, a rotary drum, a shoe disposed for movement into and out of seated frictional relation to the face of said drum, a resilient friction band overlying said shoe and encircling said drum, said band being connected to and having rotary movement with said drum, and a flexible member wound upon said band and adapted, when placed under tension, to contract said band for depressing said shoe to its seated position on said drum and for applying friction to the back of said shoe, said member having connection with and being adapted to rotate said drum.

4. In a snubber, a rotatable drum, a non-rotatable friction shoe having radial movement into and out of frictional engagement with said drum, a contractible band encircling said drum and overlying the back of said shoe, said band being movable with said drum, and a flexible member having connection with said drum and wound upon said band and adapted, when placed under tension, to depress said shoe upon the drum and to apply friction to the back of said shoe.

5. In a snubber, a stationary journal, a drum rotatable on said journal, a non-rotatable friction shoe adapted for radial movement into and out of frictional engagement with said drum, a resilient contractible member carried by and rotatable with said drum, said member being disposed in overlying relation to said shoe, and tension means for contracting said member into frictional engagement with the back of said shoe and whereby said shoe is depressed into seated relation to said drum.

6. In a snubber, a stationary journal, a drum rotatable on said journal, a non-rotatable friction shoe adapted for radial movement into and out of frictional engagement with said drum, a resilient contractible member carried by and rotatable with said drum, said member being disposed in overlying relation to said shoe, and a flexible member attached to and wound about said drum and passed over the back of said contractible member, said flexible member being adapted, when placed under drum-rotating tension, to contract said contractible member both for forcibly seating said shoe in friction applying relation to the drum and for applying friction to the back of said shoe.

7. In a snubber, a stationary journal, a drum rotatable on said journal, a non-rotatable friction shoe adapted for radial movement into and out of frictional engagement with said drum, a resilient contractible member carried by and rotatable with said drum, said member being disposed in overlying relation to said shoe, a flexible member attached to and wound about said drum and passed over the back of said contractible member, said flexible member being adapted, when placed under drum-rotating tension, to contract said contractible member both for forcibly seating said shoe in friction applying relation to the drum and for applying friction to the back of said shoe, and a coiled spring having an end attached to a stationary part, whereby said drum is retracted to its normal position following forward rotary movement thereof.

In testimony whereof, I affix my signature.

ROYCE R. FOSTER.